(12) United States Patent
Balinsky et al.

(10) Patent No.: US 7,831,907 B2
(45) Date of Patent: Nov. 9, 2010

(54) GROUPING OF INFORMATION ITEMS ON A PAGE

(75) Inventors: Helen Balinsky, Bristol (GB); Maurizio Pilu, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 1038 days.

(21) Appl. No.: 11/484,389

(22) Filed: Jul. 11, 2006

(65) Prior Publication Data

US 2007/0100874 A1 May 3, 2007

(30) Foreign Application Priority Data

Oct. 27, 2005  (GB) ................... 0521892.0

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06K 9/00* (2006.01)

(52) U.S. Cl. ............... 715/243; 715/204; 715/235; 707/999.102; 382/112

(58) Field of Classification Search ............ 715/243, 715/235, 221, 224, 204; 382/112; 707/102, 707/999.102

See application file for complete search history.

(56) References Cited

U.S. PATENT DOCUMENTS

| 4,949,287 | A  | * | 8/1990  | Yamaguchi et al. | 715/246 |
|-----------|----|---|---------|------------------|---------|
| 5,889,523 | A  |   | 3/1999  | Wilcox et al.    |         |
| 5,890,175 | A  | * | 3/1999  | Wong et al.      | 715/236 |
| 7,434,159 | B1 | * | 10/2008 | Lin              | 715/243 |
| 7,469,378 | B2 | * | 12/2008 | Nagahara et al.  | 715/243 |
| 2004/0078759 | A1 | * | 4/2004  | Ohashi et al.    | 715/517 |
| 2004/0205588 | A1 | * | 10/2004 | Purvis et al.    | 715/513 |
| 2006/0039585 | A1 | * | 2/2006  | Harrington et al. | 382/112 |
| 2007/0118797 | A1 | * | 5/2007  | Layzell          | 715/517 |

OTHER PUBLICATIONS

Ngo, David Check Ling, et al. "A Mathematical Theroy of Interface Aesthetics", Faculty of Information Technology, Multimedia University, Malaysia, Obtained from website: http://www.mi.sanu.ac.yu/vismath.ngo/ (20 Pages).

* cited by examiner

*Primary Examiner*—Stephen S Hong
*Assistant Examiner*—Nicholas R Hasty (57) ABSTRACT

A method for computing apparatus to create a page with a plurality of information items laid out upon it is described. A plurality of information items and a definition of one or more groups of information items to be formed on the page are received, as is a candidate layout of the information items on the page. Perceptual distances between information items in the candidate layout are determined, the perceptual distances representing both physical distance and graphical variation between relevant information items. It is determined from the perceptual distances whether the candidate layout satisfies predetermined criteria such that the candidate layout is perceived as visually representing the one or more groups. If the candidate layout is not perceived as visually representing the one or more groups, it is modified or regenerated until it does so.

20 Claims, 8 Drawing Sheets

GROUPING OF INFORMATION ITEMS ON A PAGE

FIELD OF THE INVENTION

The invention relates to methods, apparatus and program products for grouping of information items on a page, and is particularly relevant to custom publishing of documents.

BACKGROUND TO THE INVENTION

Custom publishing of documents typically involves production of documents which contain variable numbers of information items such as pictures, text or backgrounds. One approach to laying out information items in a page layout is to have a template into which different information items are placed. While computationally straightforward (unless complexity is introduced by offering rules for determining use of alternative templates), this approach is inflexible and may lead to aesthetically unsatisfactory results (such as overlap between items).

More satisfactory results may be achieved by determining a collection of information items to be displayed on a page, generating a candidate layout with a layout engine and determining whether the candidate layout meets predetermined criteria. These criteria may be representative of aesthetic considerations. Layout engines of this type may produce very good results in achieving aesthetically attractive layout of information items on a page. A difficulty with this approach, however, is that in many contexts it is desirable for specific information items, and not others, to be grouped together. For example, in a customised catalogue, it is clearly desirable that information items relating to one product are grouped together so that it will be readily perceived that they all relate to one product (and so that other information items are not perceived as relating to that product). The consequences of failing to do this successfully can be significant—for example, if a price is grouped with details of an item to which it does not relate, the catalogue provider may be obliged to sell a customer the item for the incorrect price. Even for layout engines that are otherwise successful in producing aesthetically satisfactory layouts, there is currently no satisfactory solution to this problem beyond introducing a manual checking step. For customised catalogue generation, this may be prohibitively expensive.

SUMMARY OF THE INVENTION

In a first aspect, the invention provides a method for computing apparatus to create a page with a plurality of information items laid out upon it, the method comprising: receiving the plurality of information items and a definition of one or more groups of information items to be formed on the page; receiving a candidate layout of the information items on the page; determining perceptual distances between information items in the candidate layout, the perceptual distances representing both physical distance and graphical variation between relevant information items; determining from the perceptual distances whether the candidate layout satisfies predetermined criteria such that the candidate layout is perceived as visually representing the one or more groups; and modifying or regenerating the candidate layout if it is not perceived as visually representing the one or more groups until it does so.

DESCRIPTION OF DRAWINGS

Specific embodiments of the invention will now be described, by way of example, with reference to the accompanying drawings, of which.

DESCRIPTION OF SPECIFIC EMBODIMENTS

Embodiments of the invention will now be described. Description will be with particular relevance to generation of custom catalogues and brochures (customised, for example, to a specific reader), though it will be appreciated that it may be used in many other contexts. Certain embodiments relate to printed documents, although it will also be appreciated that the approach indicated here is applicable to layout and display of electronic documents.

Figure 1:
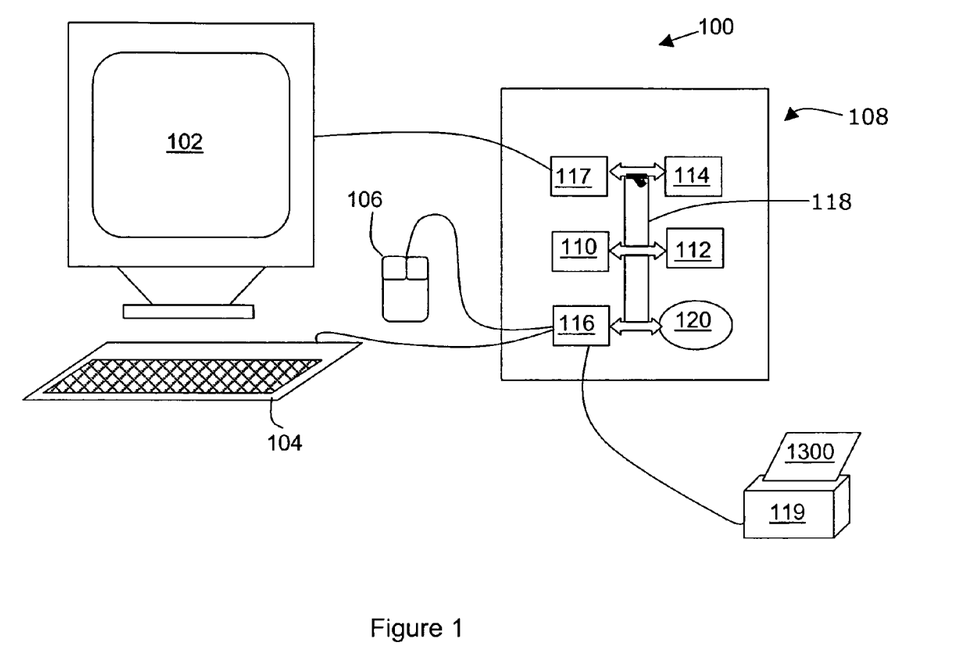
FIG. 1 shows a computer system suitable for use in embodiments of the invention.

FIG. 1 shows a computer apparatus 100 suitable for use in embodiments of the invention. The computer 100 comprises a display 102, in this case an LCD (Liquid Crystal Display) monitor, a keyboard 104, a mouse 106 and processing circuitry 108. It will be appreciated that other displays such as LEP (Light Emitting Polymer), CRT (Cathode Ray Tube) displays, projectors, televisions and the like may be equally possible.

The processing circuitry 108 comprises a processor 110, a hard drive 112 (containing a store of data), memory 114 (RAM and ROM), an I/O subsystem 116 and a display driver 117 which all communicate with one another, as is known in the art, via a system bus 118. The processor 110 typically comprises at least one INTEL™ PENTIUM™ series processor, (although it is of course possible for other processors to be used) and performs calculations on data. The other processors may include processors such as the AMD™ ATHLON™, POWERPC™, DIGITAL™ ALPHA™, and the like.

The hard drive 112 is used as mass storage for programs and other data. The memory 114 is described in greater detail below and with reference to FIG. 2.

The keyboard 104 and the mouse 106 provide input means to the processing means 110. Other devices such as CDROMs, DVD ROMs, scanners, etc. could be coupled to the system bus 118 and allow for storage of data, communication with other computers over a network, and other normal functions of computer apparatus. Any such devices may then comprise further inputs to the computer apparatus.

The I/O (Input/Output) subsystem 116 is arranged to receive inputs from the keyboard 104 and from the processor 110 and may allow communication from other external and/or internal devices. The display driver 117 allows the processing means 110 to display information on the display 102.

The processing circuitry 108 further comprises a transmitting/receiving element 120 such as a modem, which is arranged to allow the processing circuitry 108 to communicate with a network. The transmitting/receiving element 120 also communicates with the processing circuitry 108 via the bus 118.

The processing circuitry 108 could have the architecture known as a PC, originally based on the IBM™ specification, but could equally have other architectures. The processing circuitry 108 may be an APPLE™, or may be a RISC system, and may run one of a variety of operating systems (such as HP-UX, LINUX, UNIX, MICROSOFT™ NT, AIX™, for example). The processing circuitry 108 may also be provided by devices such as Personal Digital Assistants (PDAs), mainframes, telephones, televisions, watches or the like.

The computer apparatus 100 also comprises a printer 119 which connects to the I/O subsystem 116. The printer 119 is arranged to print documents 1300 therefrom.

Figure 2:
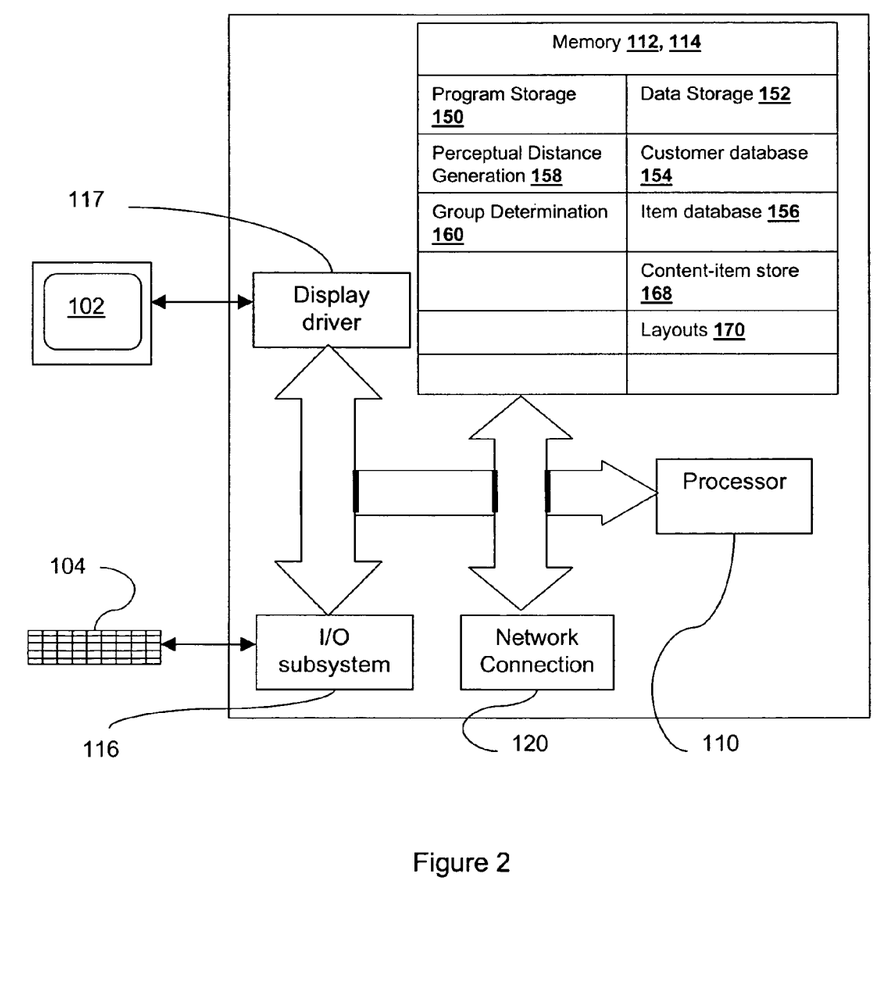
FIG. 2 shows functional detail of the computer system of FIG. 1 disposed for carrying out embodiments of the invention.

FIG. 2 shows the memory 114 of the computer 100 of FIG. 1 in greater detail. It will be appreciated that although reference is made to a memory 114 it is possible that the memory could be provided by a variety of devices. For example, the memory may be provided by a cache memory, a RAM memory, a local mass storage device such as the hard disk 112, any of these being connected to the processing circuitry 108 over a network connection such as via the transmitting/receiving element 120. However, the processor 110 can access the memory via the system bus 118, accessing program code to instruct it what steps to perform and also to access the data. The processor 110 then processes the data as outlined by the program code.

The memory 114 is used to hold instructions that are being executed, such as program code, and contains a program storage portion 150 allocated to program storage. The program storage portion 150 is used to hold program code that can be used to cause the processor 110 to perform predetermined actions. As can be appreciated by one of ordinary skill in the art, the program code stored by the program storage portion 150 may be stored in any computer readable medium. The computer readable medium may comprise any one of many physical media such as, for example, electronic, magnetic, optical, electromagnetic, infrared, or semiconductor media. In embodiments of the invention, the program storage portion 150 comprises a perceptual distance calculating function 158 and a group determination function 160 as described further below.

The memory 114 also comprises a data storage portion 152 allocated to holding data and in custom generation of documents for a customer comprises a customer database 154 and an item database 156. The customer database 154 contains data relating to customers and their preferences and the item database 156 contains information on that it may be desired to insert into the printed document that it being laid out. The data storage portion also contains a content-item store 168 and a store for candidate or actual page layouts 170.

The present invention does not specifically relate to the choosing of items from the item database to be laid out on a page, or in a document, in a way appropriate to our consistent with customer preferences—this is described elsewhere in the literature of customised publishing and any appropriate approach may be used to provide inputs for this invention.

Information items may be formed from input data held at least in part in the item database 156. Information items may be derived from any of the following: dynamic data held in the customer database 156, author preferences and style (style data) and fixed and static data (fixed data) which are combined to generate the information items. Information items may also simply exist in a store such as content-item store 168, from which they are chosen. Grouping information may be provided in any of these locations—for example, the content-item store 168 may hold potential catalogue items with associated database entries (price, product category) or references to other information items (picture, descriptive text) and grouping information may be provided automatically (picture, price and descriptive text for a content-item will all be displayed and will form one group) or may be determined according to appropriate rules (such as "all content-items to be shown in the same category will form a group together with a label indicating the category"—this would allow all kettles to be grouped together, along with a label "kettle").

Figure 3:
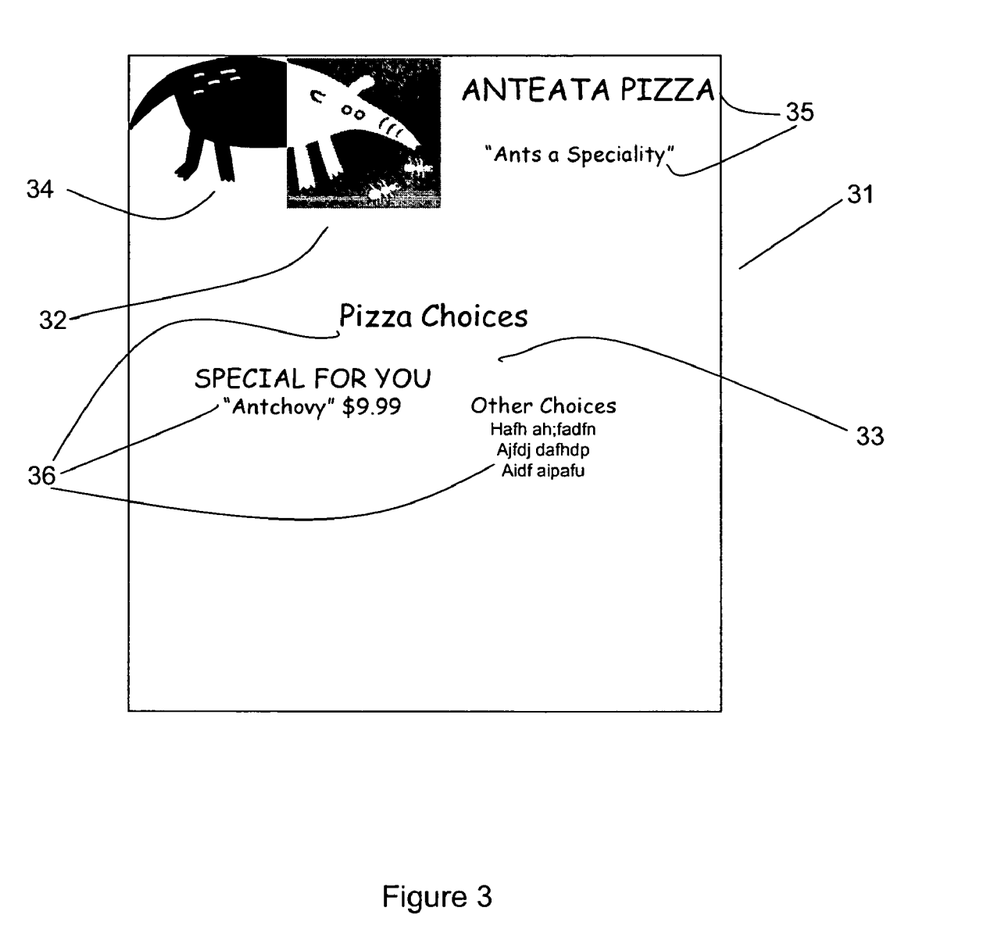
FIG. 3 indicates groups of information items disposed on a page such as may be produced by embodiments of the invention.

Exemplary information items are shown in FIG. 3 in a page layout. FIG. 3 shows a part of a customised customer menu 31, and contains two exemplary groups of information items. Group 32 contains a graphic image 34 and two text items 35: these all relate to the title of the menu. Group 33 contains three text items 36—these all relate to one aspect of the menu, and include a special item customised to this customer. In this layout, groups 32 and 33 are clearly separated from each other, and each would be perceived as a separate group. It can be appreciated, however, that group 32 appears more well-formed and clearly visually linked as a group than does group 33. If a further group similar to group 33 and indicating another aspect of the menu was added, distinct separation from group 33 would be needed to prevent confusion. Achieving such effects in automatic creation of pages is addressed in the following discussion of embodiments of the invention.

In a catalogue, the position would typically be more complex than is shown in FIG. 3. In such documents, a page consists of several different logical groups, often at different hierarchical levels. For example, elements comprising a sale item (a title, description, price, and an image) will form a logical group. It should, in a satisfactory layout, be easy to distinguish between any two neighbouring such logical groups on the same page—a typical catalogue page may contain 5 to 15 such groups. A next hierarchical level of grouping appropriate to the same example would be a requirement to group some items together, such as a requirement to: place all kettles, or all 10% sale items, together. Such a higher level group may have a common title or may be emphasized or set off by different means. Such groups are visually separated by different alleys, line separators or even placed on different backgrounds to provide visual clues to the reader about their logical distinction. Such visual unity or grouping is extremely important for adequate document comprehension by the reader. There is thus value in the ability to verify that automatically generated candidate layout preserves an original or intended logical grouping.

Figure 4:
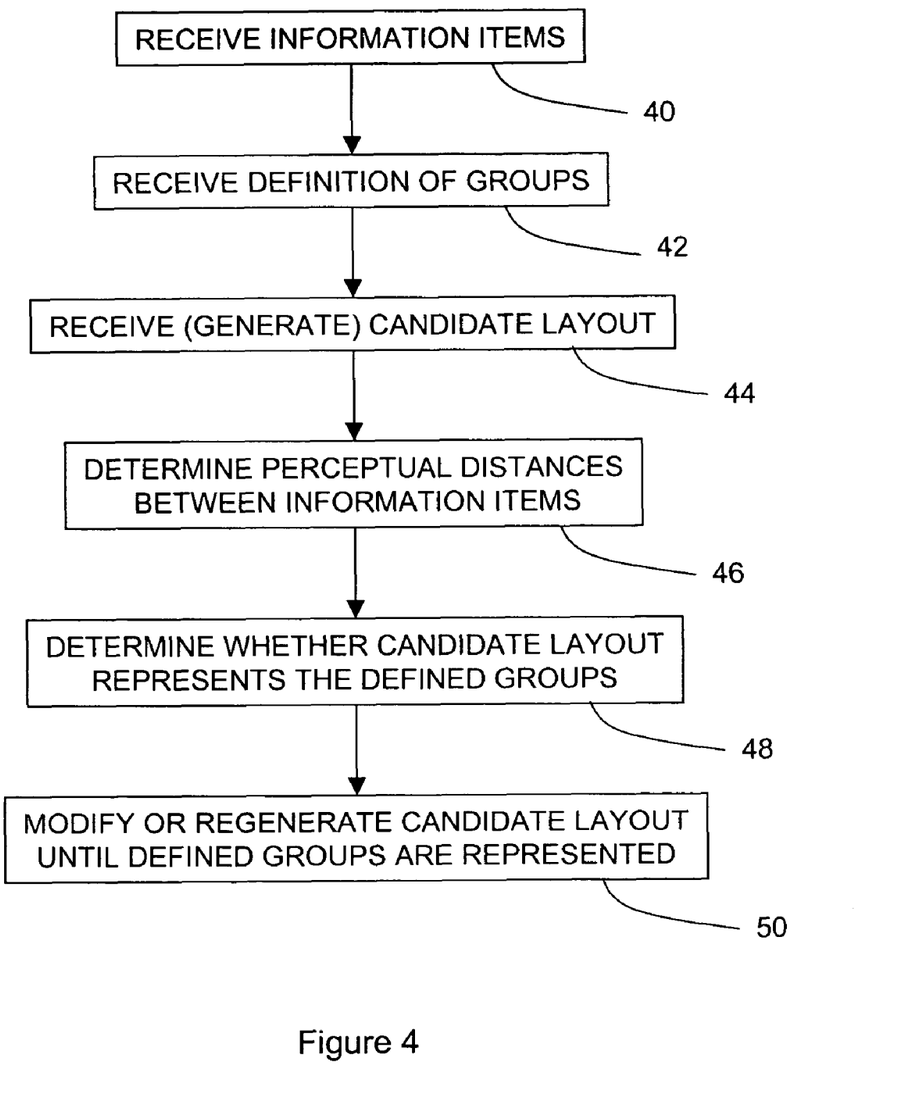
FIG. 4 indicates schematically an embodiment of the invention.

FIG. 4 indicates elements of an embodiment of the invention. It should be appreciated that the invention does not relate to the whole process of selecting items for display on a page and arranging them, but only to ensuring that items provided for display are disposed—according to an objective assessment of factors related to user perception—in groups as originally defined. Embodiments of the present invention may therefore be provided as a late stage of a full page composition process. Embodiments of the present invention thus have the initial steps of receiving 40 a plurality of information items for display and receiving 42 a definition of groups in which these information items are disposed. This definition may, for example, be a hierarchical definition (in that groups may themselves be considered as elements within other groups). This has considerable practical value, as it is frequently desirable to establish such structural hierarchies within documents such as catalogues.

A further initial step in embodiments of the invention is the receipt 44 of a candidate layout of information items on the page. This may be achieved by any of a range of conventional approaches—including, for example, the scheme proposed by the applicants in their co-pending U.S. patent application Ser. No. 11/190,237 entitled "General Scheme For Automatic Layout Of Highly Customized Documents" and filed on 27$^{th}$ Jul. 2005 (which is hereby incorporated by reference to the extent permitted by law), though in principle any type of layout engine may be used (though they may differ in the likelihood that a specific layout produced can be modified to represent a desired group structure, as will be discussed below, rather than rejected so that a new specific layout must be generated). The candidate layout may include some mechanism for achieving grouping (such as, for example, a mechanism to ensure that each group member is adjacent to or overlies at least one other group member)—use of embodiments of the present invention means that it is not necessary to rely on such prior art mechanisms providing representations of groups that are visually perceived by users as being representative. Embodiments of the present invention may simply confirm that a particular candidate layout is effective to do this, while having the potential to modify candidate layouts that are not effective.

From these inputs, in embodiments of the present invention perceptual distances between information items in the candidate layout are determined 46. These perceptual distances represent both physical distance and graphical variation between relevant information items. The present inventors have appreciated the value of using such a measure in determining the presence or absence of perceived unity in a grouping. There are known aspects (as, for example, in the Gestalt theory of perception) that contribute to perceived unity: similarity (of size, colour or shape); alignment; proximity; separation between different groups; and common background for a group. Similarity is relevant as using similar sizes (in particular), shapes (and relevant elements such as direction and texture) or colours contribute to a perception of unity. The lining up of elements contributes to the perception that elements form a group, as does the placement of elements close together or setting them apart from other elements by use of a border or other delimiter. Placing elements on a common background also contributes to a perception that those elements form a group. Effective measures of perceptual distance reflect these factors which promote perceived unity. Discussion of more specific measures of perceptual distance follows further below. Description of details of a specific embodiment of the invention will indicate approaches to measurement of perceptual distance between information items, and will indicate choices that can be made in determining which information items to measure between.

From the measured perceptual distances, it is then determined 48 of whether the candidate layout represents the defined groups. In embodiments of the invention, an iterative approach is employed, working through each group as defined, to determine whether predetermined conditions for the perceived existence of a group with those elements are met. Where conditions are not met, the candidate layout is then 50 modified—for example, to increase a perceptual distance to an improper group member, or to decrease a perceptual distance to a proper (but currently perceived as excluded) group member—or even replaced by a different candidate layout if modification will not be effective. Physical distance as well as perceptual distance may be used to determine whether modification will or is likely to be effective and thus should be attempted (for example, if there is no unwanted element intervening between true group members, in which case increasing separation between unwanted elements and group members will have no effect on the relationships between group members themselves). If modification should not be attempted, replacement is used. Such modification or replacement continues (with, if necessary, recalculation of perceptual distances) until a final version of the candidate layout is found to represent the defined groups.

Figure 6:
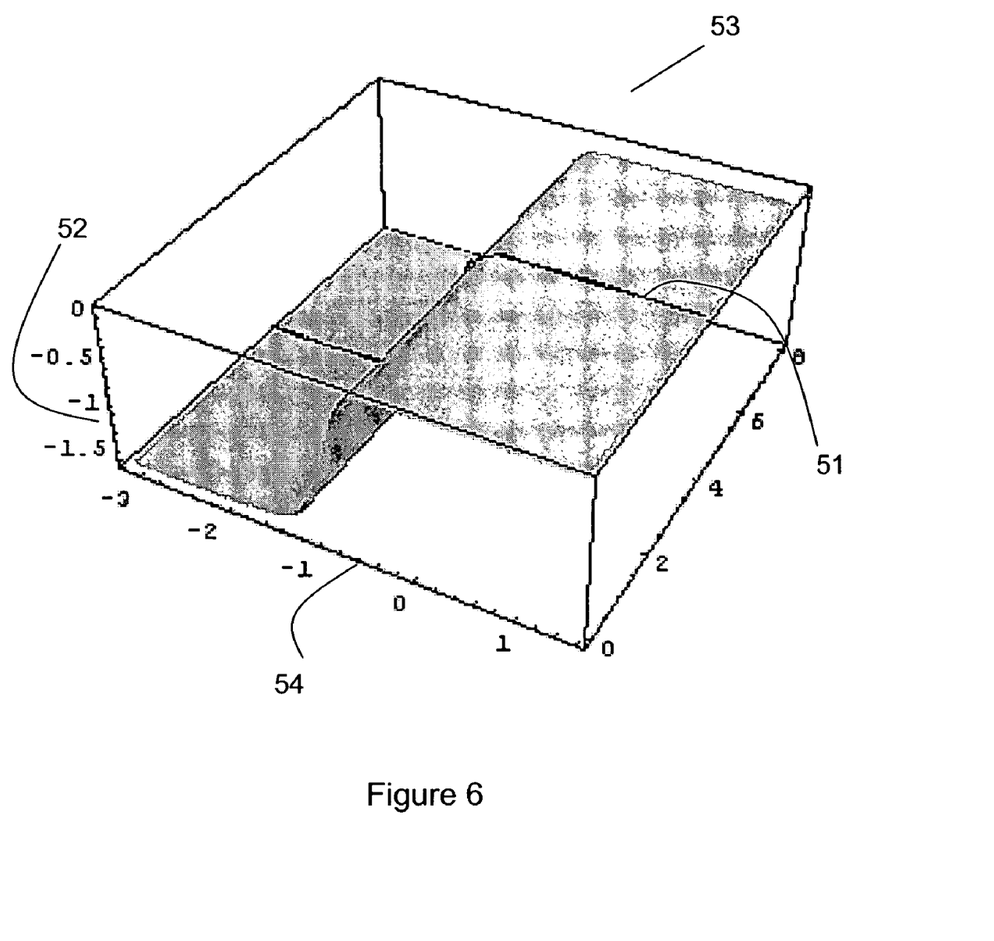
FIG. 6 indicates perceptual distance between two information items on different colour background determined in accordance with one embodiment of the invention.
Figure 7:
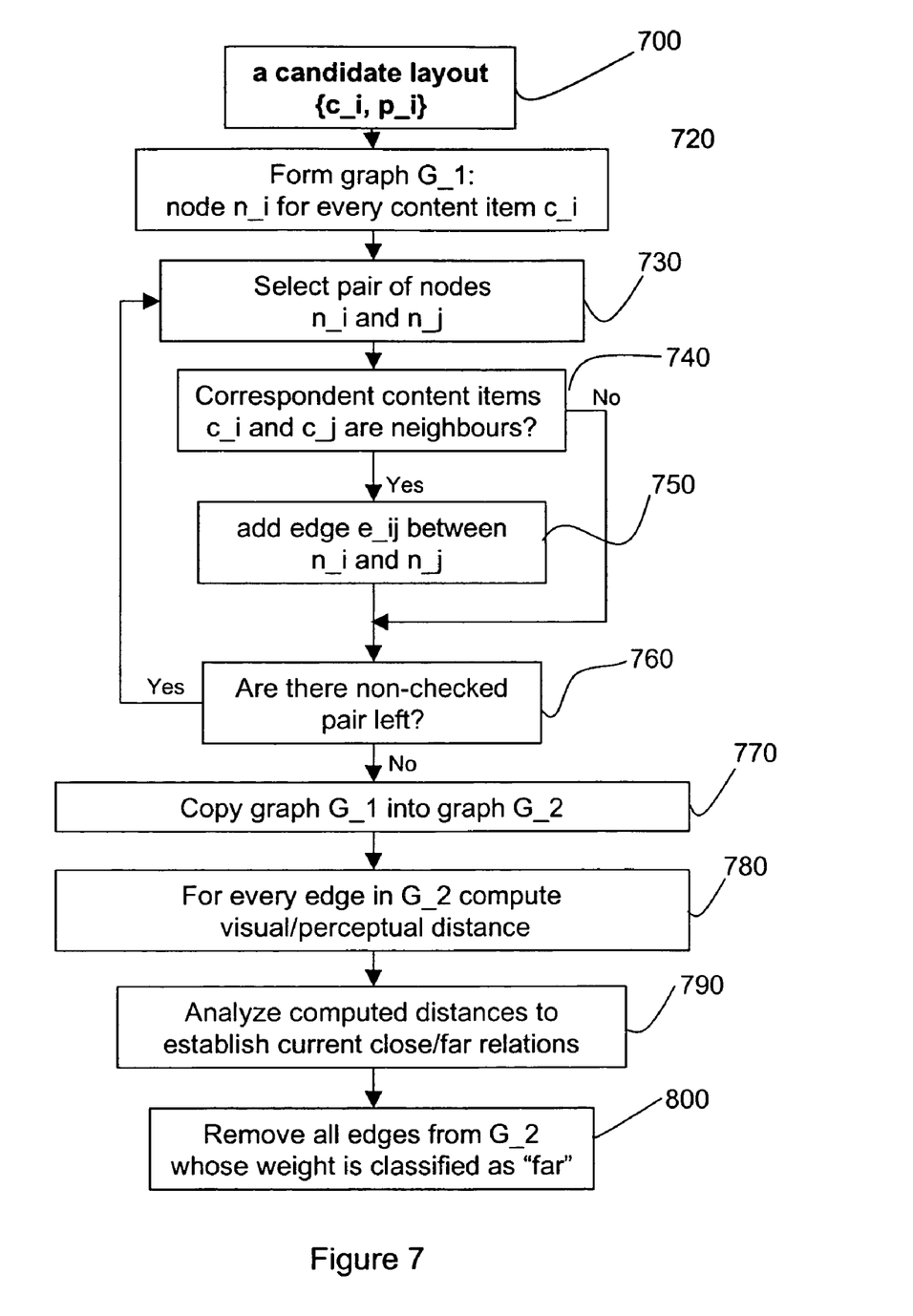
FIG. 7 indicates determination of perceptual distance between information items for a candidate layout in accordance with an embodiment of the invention.
Figure 8:
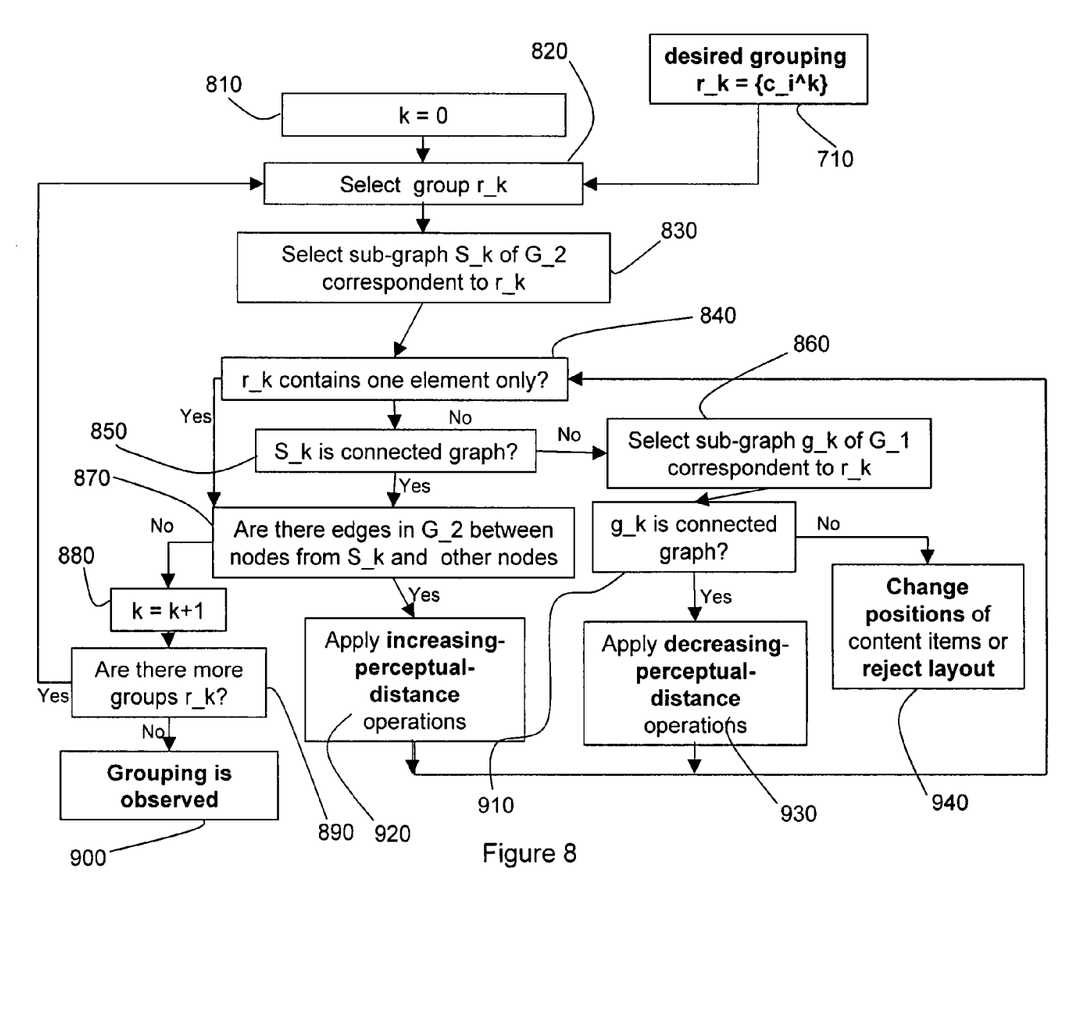
FIG. 8 indicates determination from perceptual distances between information items whether a candidate layout represents one or more groups in accordance with an embodiment of the invention.

A specific embodiment of the invention will be further described with reference to FIGS. 7 and 8—in the course of this further description there will be described further detail of exemplary processes for determining perceptual distances between information items and use of these perceptual distances to determine whether a candidate layout represents the defined groups. Before this further description, however, further comments will be provided on appropriate measures for perceptual distance—these will be discussed with reference to FIGS. 5 and 6.

A scalar perceptual distance between two items i and j can be determined according to the following relation:

$$D(i,j)=F(M(i,j))$$

where M(i,j) is a n-dimensional vector between item i and item j in an n-dimensional perceptual distance space, and F is a function (generally a non-linear function) of this vector. The measure vector M(i,j) may include a geometrical distance but it is not limited to it—it also contains at least one dimension relating to graphical variation between item i and item j. This variation may be in colour variation in the path between the two items, a measure of alignment (co-linearity) of the items, comparability of features such as font sizes, any other measure of separation, or some combination of any or all of these and other appropriate elements. While the function F may simply be the Euclidean distance, it could be effectively any other form of function (and may be achieved by an appropriate calculation structure—such as a look-up table or neural network—from the components of the vector).

A simple example of an effective perceptual distance measure involves at least one physical distance co-ordinate and at least one colour space co-ordinate. In one effective measure, two physical co-ordinates (x, y) are used along with three colour coordinates (r, g, b). Each colour co-ordinate indicates changes in colour along an a physical path between item i and item j. The perceptual distance measure can be found by a geodesic line in this perceptual distance space between the two items—the geodesic line corresponds to the shortest distance (perceptual distance, rather than physical distance) between the points. In this five-dimensional space, the perceptual distance D (i,j) would thus be:

$$D=k\sqrt{x^2+y^2+r^2+g^2+b^2}$$

Figure 5:
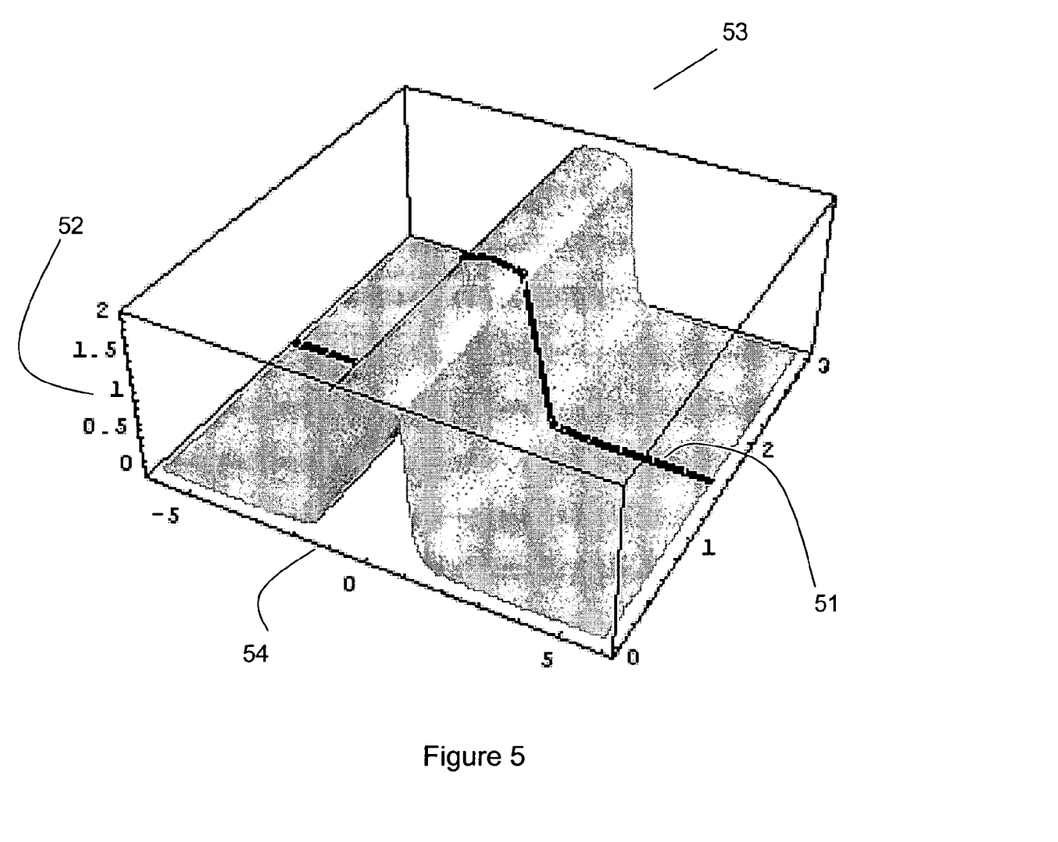
FIG. 5 indicates perceptual distance between two information items separated by a delimiter determined in accordance with one embodiment of the invention.

For exemplary purposes, a two-dimensional space (with one physical distance dimension and one colour change dimension) can be used instead of a five-dimensional one. The effectiveness of this type of perceptual distance space to provide a measure of similarity can be seen by considering the examples in FIGS. 5 and 6. Both Figures show a perceptual distance space 53 with a physical distance dimension 52 and a colour change dimension 54. A geodesic line 52 is drawn between two items. FIG. 5 shows a homogeneous colour field between the two items with a line running across it. The line creates a localised colour change causing a ridge in the colour change dimension—the rising and falling edges of the ridge significantly increase the perceptual distance between the items, reflecting the perceptual distancing between the two items caused by the intervening line. FIG. 6 shows a border between colour backgrounds—the first item is on a different colour background to the second item, there being a step change in the colour change dimension at the border between the two backgrounds and leads to increased perceptual distance. In both these cases, the perceptual distance measure reflects intuitive user perception—we are disposed not to group items separated by delimiters or on different backgrounds.

Other factors may be included either by use of further dimensions in the perceptual distance space, or by inclusion within function F. For example, similarity between items (for example, similarity of font size or style) may be included by using a similarity coefficient k-k may simply be a multiplier of the Euclidean distance in the perceptual distance space.

Detailed exemplary processes for determining perceptual distances between information items (termed content items in the discussion which follows) will now be described with reference to FIG. 7. At this point the defined groups need not be considered—the relevant input 700 is the candidate layout, which can be considered to be of the form (c_i, p_i) comprising a set C of content items c_i and their positions p_i grounded on a page. A graph G_1 is formed 720 with a node n_i for each content item c_i. There then follows a loop 730, 740, 750, 760 effective to join by an edge each pair of content items which are neighbours (in terms of physical distance—geometrical neighbours—though as is discussed below, weighting may be provided to favour perceptually important features) in the layout. A pair of nodes is selected 730. A determination is made 740 as to whether this pair of nodes forms a pair of geometrical neighbours—if it does, then these nodes n_i and n_j are connected 750 by an edge e_ij. This process continues 760 until all pairs of nodes have been checked.

Generally, two content items on a page are neighbours if there is no other content item located between them. Such content items may share a common border, may be separated by some empty space (such as an alley), or may be separated by some graphical object which is not a content item (such as a delimiter line). Some cases may not be straightforward, in which case a measure needs to be employed. Physical distance can be assessed in a simple analytical form, such as the Euclidean distance between the centres of mass of each content item, or the minimum distance between any part of one content item and any part of the other. However, such distances may also be weighted to give more importance to horizontal and vertical alignment (thus providing an additional perceptual component). For example, such a weighting w could be provided by an expression such as:

$$w = |(1-k)\sin(2\acute{\alpha}) + k|$$

where $\acute{\alpha}$ is the alignment with respect to the horizontal axis (for example, for horizontal alignment $\acute{\alpha}=0$, and for vertical alignment $\acute{\alpha}=\pi/2$) and k is a constant. As w varies from k to 1 as the angle changes, blocks that are aligned vertically or horizontally will have a smaller weighted distance. This follows the natural perception that items that are vertically or horizontally aligned are more likely to be considered to be related than items that are adjacent in some diagonal direction. Here, two diagonally positioned objects are considered to be neighbours only if there are no horizontal or vertical objects lying at the same distance.

When these edges e_ij have been identified and added, graph G_1 is copied 770 into graph G_2. As will be discussed below, it is useful to retain graph G_1 as this provides an indication of the physical rather than the perceptual relationships between information items. For every edge e_ij, the perceptual distance is measured 780 according to the principles indicated above (for instance, by a geodesic line in the five-dimensional perceptual space employing two physical and three colour space components). A perceptual distance threshold H is then established 790 for the candidate layout to determine whether nodes joined by an edge are to be considered "near" or "far" from each other. As the skilled person will appreciate, this threshold should not for good results be the same for all documents (as information items may be of quite different form and type between documents), but may be provided according to a known rule or rules or may be determined from the distribution of some or all of the perceptual distances found in the document. Assessment as to whether this threshold has been met may be made for all distances, or may be made per node. Per node assessment may be made by considering (for each node in G_2) weights on the incoming edges. Size of the node may be a factor—the perceptual distance threshold H may contain a node size factor, as larger objects will still appear grouped at distances for which smaller objects would not appear to be grouped. Edges classified as being between nodes which are "far" from each other are then removed 800.

Detailed exemplary processes for determining from perceptual distances between information items (again termed content items in the discussion which follows) whether the candidate layout represents predefined groups will now be described with reference to FIG. 8. FIG. 8 also indicates processes that can be followed to modify or replace the candidate layout if necessary to ensure that the candidate layout represents predefined groups.

At this stage, the definition of the desired grouping is needed 710. This definition is of the form r_k for all identified groups, where k is a positive integer or zero. Each value k identifies one of the groups of content items in the candidate layout—one such group may itself contain one or more groups of content items within it in a hierarchical fashion. For a first group k is set to 0 in step 810 and the first group r_0 is selected. The subgraph S_k of G_2 corresponding to this value of k is selected 830.

The next step is to assess 840 whether r_k contains one element or a plurality. If there is only one element in the subgraph S, then the next step 870 is to determine whether there are any edges or if the node is isolated—if the node is isolated, the group has been successfully represented by the candidate layout, while if the node has edges attached, perceptual distance to the node connected by the edge needs to be increased 920 as shall be discussed further below.

If there is a plurality of nodes in the group, an assessment is made 850 as to whether S_k is a connected graph. If yes, an assessment is made 870 as to whether any edges exist in G_2 which join nodes from S_k to other nodes—if so, it will again be necessary to increase perceptual distance to the node outside S_k. If S_k is not however a connected graph, a subgraph g_k of G_1 corresponding to this group is selected 860 and is itself assessed 910 to determine whether it is a connected graph. If g_k is a connected graph but S_k is not, this is an indication that at least one element has become disconnected from the group—perceptual distance to the disconnected element or elements needs to be decreased 930 as shall be discussed further below.

If neither S_k nor g_k is a connected graph, then there is a disconnected element that is simply not close to its siblings—the physical relationship between information items is used to determine whether the candidate layout can be modified to produce an acceptable result, or if a successful result is impossible (or too unlikely to be worth pursuing). If this is the case, then a major change to the layout is required 940. One possibility is for elements within the candidate layout to be swapped, or modified in some other significant way—where this is not possible, the existing candidate layout may simply be replaced by a new one generated typically in the same manner as was the original candidate layout.

After changes to the layout or to perceptual distance between nodes, steps 840 onwards are carried out as necessary until the condition for representation of a group is met, k is incremented 880 and it is determined whether a further group needs to be selected 890. If it does, then the process continues for the new group from group selection step 820 and subgraph selection 830. If no further group needs to be selected, then the candidate layout as pertaining at that point (possibly as originally provided, possibly as modified or even replaced from the original candidate layout) is considered 900 to represent the defined groups.

For increasing perceptual distance as is required by step 920, the following approaches may be used to raise the perceptual distance to a wrongly-included element beyond the appropriate threshold value.

Colour separation. The intended elements of the group requiring modification can be placed on a common background or surrounded by a border line. The perceptual distances between true group elements will not change, but the perceptual distance to the violating element will increase.

Nudging. The violating element can be nudged away from the group. This may be simply to increase geometrical distance, but may also be because the violating element is aligned with intended group elements (in which case nudging the violating element out of alignment may have a significant impact in increasing its perceptual distance to intended group members).

Element adjustment. If the violating element has some parameters similar to the nearest true element of the group, then these parameters can be adjusted. For example, if two blocks of text which are not in the same group are perceptually close to each other through partly through similarity in font, then any of the colour, the font-size, the font-type or the font-face could be altered for one block of text.

In a similar fashion, for decreasing perceptual distance as is required by step 930, the following approaches may be used to reduce the perceptual distance to a wrongly-excluded element to below the appropriate threshold value.

If there is a border line excluding the element, then it can be changed in colour or removed altogether.

All elements of the group may be placed on a common background.

The violating element may be nudged (as described above) closer to the group.

The violating element may be moved into alignment with at least one relevant other member of the group.

Some properties of the violating element may be modified to achieve better similarity to one or more other elements of the group (for example, by changing a font or by cropping an image to have a similar aspect ratio).

A violating element may be made to appear closer to its group by making elements not in the group perceptually more distant as well as by making the violating (excluded) element closer to the other elements of the group.

While in principle embodiments of the invention could be used in the middle of an automatic page layout process, it would be difficult for further steps to take place without risk of disturbing the validated group structure. It will therefore generally be the case that use of embodiments of the invention to validate or impose a required group structure in a page layout will be at the end of a group layout process, just before, for example, the page is rendered for printing or for display.

The invention claimed is:

1. A method for computing apparatus to create a page with a plurality of information items laid out upon it, the method comprising:
   receiving the plurality of information items and a definition of one or more groups of information items to be formed on the page;
   receiving a candidate layout of the information items on the page;
   determining perceptual distances between information items in the candidate layout, each of the perceptual distances representing both physical distance and graphical variation between any two relevant information items, each of the perceptual distances determined according to a length of a geodesic line between a first point and a second point in an at least two-dimensional space having at least one physical dimension and at least one colour dimension;
   determining from the perceptual distances whether the candidate layout satisfies predetermined criteria such that the candidate layout is perceived as visually representing the one or more groups; and
   modifying or regenerating the candidate layout if it is not perceived as visually representing the one or more groups until it does so.

2. A method as claimed in claim 1, wherein perceptual distances comprise physical distance and changes in a colour space between a first information item and a second information item.

3. A method as claimed in claim 2, wherein the at least two dimensional space comprises a five-dimensional space having two physical dimensions and three colour space dimensions.

4. A method as claimed in claim 1, wherein modifying or regenerating the candidate layout comprises increasing the perceptual distance between one information item and one or more other information items so that the one and one or more other information items are no longer perceived to form a group.

5. A method as claimed in claim 1, wherein modifying or regenerating the candidate layout comprises decreasing the perceptual distance between one information item and one or more other information items so that the one and one or more other information items are thereafter perceived to form a group.

6. A method as claimed in claim 1, wherein modifying or regenerating the candidate layout comprises swapping the position of two of the information items so that groups perceived in the candidate layout match the group or groups defined in the definition.

7. A method as claimed in claim 1, wherein modifying or regenerating the candidate layout comprises receiving a new candidate layout and repeating the steps of generating perceptual distances and of determining whether the candidate layout represents the group or groups defined in the definition.

8. A method as claimed in claim 1, wherein the definition of one or more groups is hierarchical, in that at least one group is provided as an element of at least one other group.

9. A method as claimed in claim 1 and further comprising the step of establishing which information items in the candidate layout are geometrical neighbours, and wherein determining of perceptual distances only takes place between information items which are established to be geometrical neighbours.

10. A method as claimed in claim 1, further comprising the step of causing the page to be printed with the information items laid out so that they are perceived to be disposed in the group or groups defined in the definition.

11. A method as claimed in claim 1, wherein the definition of one or more groups of information items comprises a structure or hierarchy of relationships between information items such that the visual representation of the one or more groups indicates the structure or hierarchy of relationships between information items to a viewer.

12. Computing apparatus for creating a page with a plurality of information items laid out upon it, the computing apparatus being adapted to:
  receive as inputs to a process the plurality of information items, a definition of one or more groups of information items to be formed on the page, and a candidate layout of the information items on the page;
  perform a process of determining perceptual distances between information items in the candidate layout, each of the perceptual distances representing both physical distance and graphical variation between any two relevant information items, each of the perceptual distances determined according to a length of a geodesic line between a first point and a second point in an at least two-dimensional space having at least one physical dimension and at least one colour dimension;
  perform a process of determining from the perceptual distances whether the candidate layout satisfies predetermined criteria such that the candidate layout is perceived as visually representing the one or more groups; and
  modify or regenerate the candidate layout if it is not perceived as visually representing the one or more groups until it does so.

13. Computing apparatus as claimed in claim 12, further adapted to generate candidate layouts of the information items for provision as inputs to the process.

14. Computing apparatus as claimed in claim 12, wherein the computing apparatus is adapted to send the page to be printed when the candidate layout is perceived as visually representing the one or more groups.

15. Computing apparatus as claimed in claim 12, wherein the computing apparatus is adapted to send the page for display when the candidate layout is perceived as visually representing the one or more groups.

16. A computer-readable medium having stored thereon instructions to program a computing apparatus to perform the following functional steps:
  to receive as inputs to a process a plurality of information items, a definition of one or more groups of information items to be formed on the page, and a candidate layout of the information items on the page;
  to perform a process of determining perceptual distances between information items in the candidate layout, each of the perceptual distances representing both physical distance and graphical variation between any two relevant information items, each of the perceptual distances determined according to a length of a geodesic line between a first point and a second point in an at least two-dimensional space having at least one physical dimension and at least one colour dimension;
  to perform a process of determining from the perceptual distances whether the candidate layout satisfies predetermined criteria such that the candidate layout is perceived as visually representing the one or more groups; and
  to modify or regenerate the candidate layout if it is not perceived as visually representing the one or more groups until it does so.

17. A method as claimed in claim 4, wherein increasing the perceptual distance is performed at least in part by nudging the one information item out of alignment with the one or more other information items.

18. A method as claimed in claim 4, wherein increasing the perceptual distance is performed at least in part by surrounding the one or more other information items with a border line.

19. A method as claimed in claim 5, wherein decreasing the perceptual distance is performed at least in part by removing a border line that includes the one or more other information items.

20. A method as claimed in claim 5, wherein the one information item is an image, and wherein decreasing the perceptual distance is performed at least in part by cropping the image based at least in part on an aspect ratio of at least one image included in the one or more other information items.

* * * * *